United States Patent Office 2,934,574
Patented Apr. 26, 1960

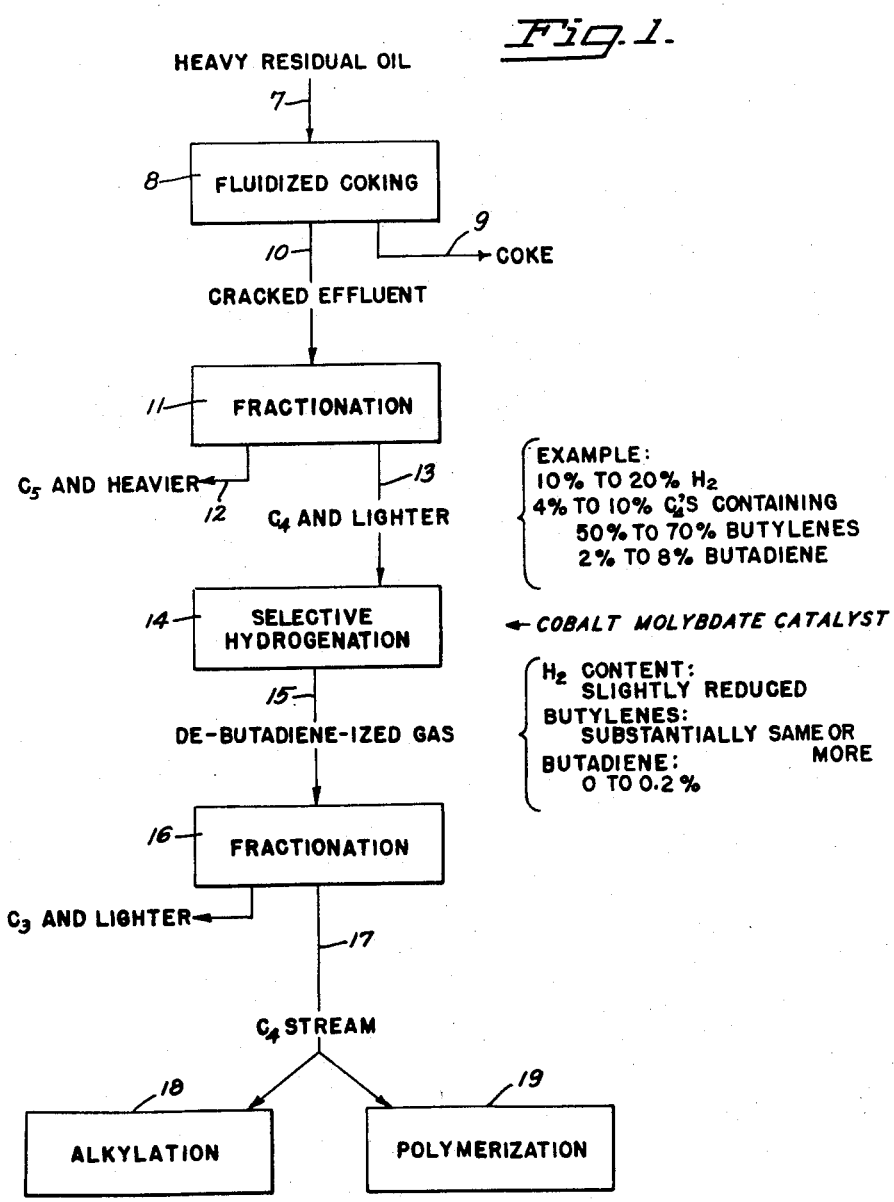

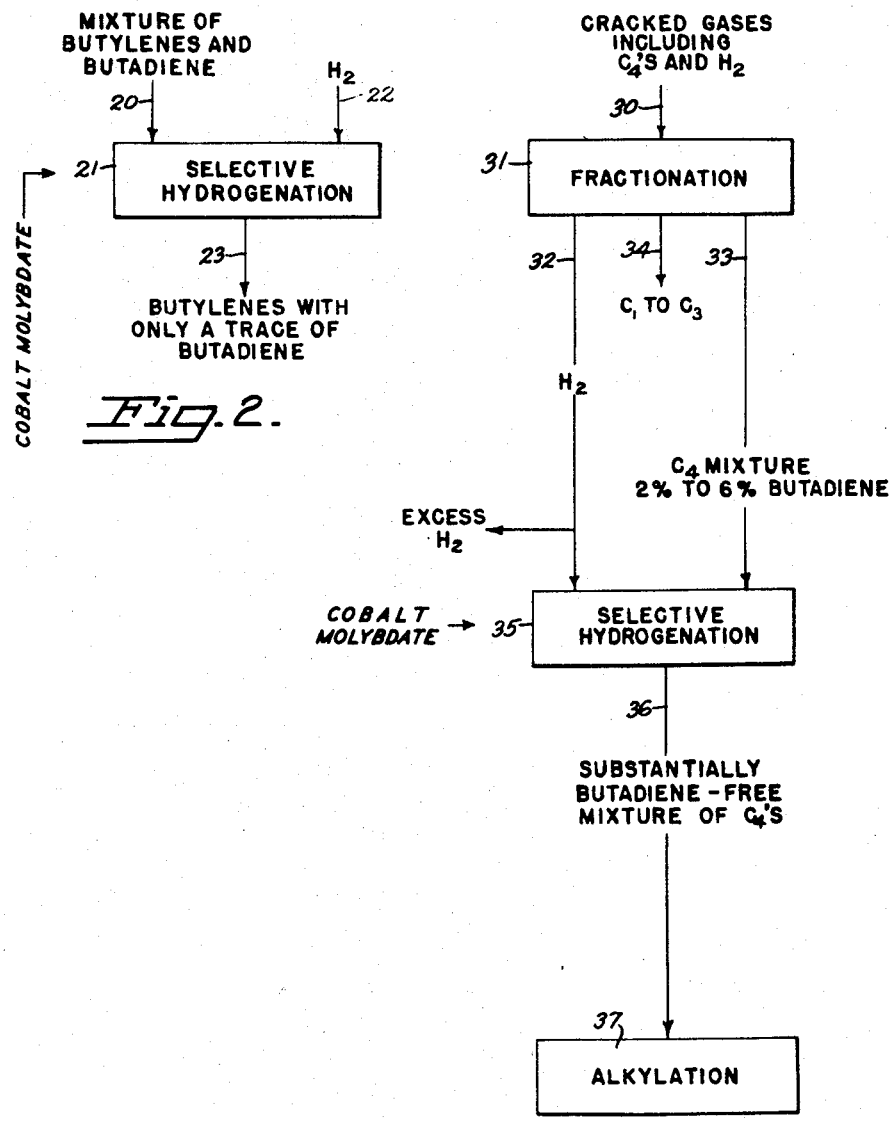

2,934,574

SELECTIVE HYDROGENATION OF BUTADIENE IN ADMIXTURE WITH BUTENES WITH COBALT MOLYBDATE AS CATALYST

Clare Kenneth Viland, Martinez, Calif., assignor to Tidewater Oil Company, a corporation of Delaware Application January 11, 1957, Serial No. 633,800

5 Claims. (Cl. 260—677)

This invention relates to treatment of hydrocarbons containing four carbon atoms and more particularly to the conversion of butadiene into butylene, without substantially affecting butylenes already contained in the mixture. The invention also relates to the treatment of the effluent gas from a fluidized coking operation to prepare its $C_4$ content for alkylation and/or polymerization.

When heavy petroleum stocks are treated by such processes as fluidized coking to convert them to more desirable lower boiling products, a substantial amount, i.e., usually between 2% and 3% of the effluent, comprises mixtures of various $C_4$ hydrocarbons. In the $C_4$ mixture, there are substantial amounts of butane, isobutane, and butylenes such as butene-1 and butene-2. However, diolefins such as butadiene are also present, in amounts between 2% and 6% of the $C_4$ content, depending partly upon the original stock and partly on the treatment thereof.

Now, a mixture of isobutane and butylene is very desirable as a charge to an alkylation or polymerization plant, but the presence of butadiene in the mixture is bad. For example, in alkylation where sulfuric acid is used as a catalyst to convert a mixture of isobutane and butylene into iso-octane, the presence of the diolefinic butadiene causes a greatly increased consumption of acid. The Alkylation Group of the Synthesis Subcommittee of the Technical Advisory Committee to the Petroleum Industry War Council stated in their Report No. AMC-1, "A Digest of Data on Alkylation," dated February 1, 1943 (p. 9):

". . . impurities in the feed may cause greatly increased acid consumption. The most undesirable impurities are probably di-olefins, which appear to have the property of causing far more than stoichiometric degradation of the acid, as if they initiated some chain of reactions, the mechanism of which has not yet been delineated. It has been observed, however, by Standard Oil Company of Louisiana, that butadiene in a mixed butylene feed causes spending of the acid corresponding to 30 pounds of acid per gallon of butadiene contained in the feed."

Butadiene also results in the formation of various compounds and polymers inimical to stabilization of the resultant iso-octane. In other words, butadiene polymers and polymers of compounds of butadiene with sulfuric acid defile the iso-octane so much that the end product is heavier and less useful.

Nor are these problems confined to the effluent resulting from fluidized coking operations. They occur wherever there is a mixture of mono-olefinic and diolefinic $C_4$ hydrocarbons, either as a separated fraction or in combination with other gases.

One important object of the present invention is to provide a method for hydrogenating the diolefins present in a $C_4$ mixture to olefins, without affecting the olefins already present.

Another object of the invention is to convert the butadiene present in a mixture of butadiene and butylenes to a mixture free from butadiene and containing increased quantities of butylene.

Another object of the invention is to enable the use of the $C_4$ fractions from fluidized coking operations in alkylation and polymerization processes by converting substantially all the butadiene therein to more useful $C_4$ compounds, thereby both eliminating the trouble-causing butadiene and increasing the amount of $C_4$ compounds usable in alkylation or polymerization.

Another object of the invention is to provide a method of de-butadiene-izing the $C_4$ and lighter fractions of the effluent from fluidized coking operations before separating the components of this light fraction of the effluent by further fractionation, so that the hydrogen present in the effluent can be used with suitable catalysts to effect a conversion of butadiene to butylenes. As a result, a step is saved, as compared with first fractionating and then re-adding some of the fractionated hydrogen.

Other objects and advantages of the invention will appear from the following description.

The invention comprises passing the mixture of butadiene and butylene over a cobalt molybdate hydrogenation catalyst in conjunction with at least the mole amount of hydrogen. I have found that this can be done without essentially lowering the amount of valuable $C_4$'s present and that selective hydrogenation takes place so that, while the diolefins are converted to olefins, very little if any of the olefins already present are converted to saturated butane. An understanding of the method will be better gained by studying the flow-sheets accompanying this specification.

In the drawings:

Fig. 1 is a flow-sheet of a method embodying the principles of the present invention, as applied to fluid coking.

Fig. 2 is a condensed flow-sheet of the basic method of the invention.

Fig. 3 is a flow-sheet of a modified form of the method embodying the principles of this invention.

Fig. 1 shows a typical example of the application of the invention to a fluidized coking operation, wherein heavy residual hydrocarbon oils 7 from various parts of the refinery are treated by fluidized coking 8. Coke 9 is drawn off as a by-product, while the desired cracked effluent 10 is also recovered and fractionated at 11 to separate the heavy portions 12 from the normally gaseous fraction 13. Any standard fluidized coking reaction may be used; so it is unnecessary to show the coking process in detail, many issued patents in this field being available for reference. A typical example of the cracked effluent 10 contains about 88% to 84% by weight of $C_5$'s and heavier, and approximately 12% to 16% by weight of the normally gaseous fraction 13. The fraction 13 may have a molal content somewhere between 10% and 20% of hydrogen (normally around 13% to 16%), 60%–70% of $C_1$ and $C_2$ gases, 10%–14% of $C_3$ gases, and, depending largely upon the constitution of the residual oil 7, between 4% and 10% of $C_4$ gases. Analysis of the $C_4$ gases in typical runs has shown that butadiene is normally present at about 2 to 8 mole percent of the $C_4$ content; the remaining $C_4$ gases being butane, iso-butane, butene-1 and butene-2. It is the butadiene that gives the trouble.

In the specific example of the invention shown in Fig. 1, the entire light fraction 13, without further fractionation, is selectively hydrogenated at 14 at the proper temperature and space velocity over cobalt molybdate as a catalyst in the presence of heat and pressure. Some of the hydrogen present breaks one of the double-bonds in each molecule of butadiene, replacing it with two atoms of hydrogen, or in other words converts the butadiene to butylene, some of it being butene-1, and some butene-2, but predominately butene-2. As the next step, the hydrogenated fraction 15 may be fractionated at 16 to provide a predominately $C_4$ fraction 17. Then the butadiene-free $C_4$ fraction 17 may be either alkylated at 18 or polymerized at 19, depending upon what is desired, with the resultant formation of iso-octane or other desirable fuel constituents which may be blended directly into the gasoline.

The abbreviated diagram, Fig. 2, shows the basic method: A mixture 20 of mono-olefinic and diolefinic $C_4$, with or without other hydrocarbons being present, is catalytically hydrogenated at 21 over cobalt molybdate, the hydrogen 22 being either already mixed with the $C_4$ mixture or added separately. The result 23 of the reaction is the elimination of the butadiene and the formation of more butylene.

An alternative form of the invention is shown in Fig. 3. Here, a cracked effluent 30 containing between 4 and 10 mole percent of the $C_4$ gases, fractionated at 31 where it is first separated into an $H_2$ fraction 32, a fraction 33 of $C_4$'s, and other fractions 34. The $C_4$ mixture 33, containing between 2 and 8 mole percent of butadiene, is catalytically hydrogenated at 35 over cobalt molybdate along with some of the hydrogen 32. The hydrogen may be present in any amount from equal mole volumes up, since the two atoms of hydrogen in each molecule are sufficient to hydrogenate one molecule of the diolefin, adding one hydrogen atom to each of the two carbon atoms formerly joined by the second double-bond. After hydrogenation, the butadiene has been eliminated, and the mixture 36 consisting only of butane, iso-butane, and butylenes may be fed directly to alkylation at 37 for conversion to iso-octane and other valuable heavier hydrocarbons.

Which precise form the process takes depends upon the requirements of the particular refinery, upon the constituents of the residual oil fed to the coking operation, and upon the type of equipment available or chosen. Preferably, the hydrogenation step is done after compression. Where the hydrogenation step precedes separation into fractions, pentadiene, propadiene and other fractions similar to butadiene may also be converted to mono-olefins at the same time. In a typical example, the temperature may lie in the range of 300° F. to 600° F. and preferably lies in the range of 400° F. to 450° F.; the space rate may lie between 200 and 10,000, preferably between 1000 to 3000, standard cubic feet of gas per cubic foot of cobalt molybdate. (These space velocities correspond roughly to liquid hourly space velocities of 1 to 40 cubic feet of liquid per cubic feet of catalyst for the broad range and 4 to 12 for the preferred range.) With higher space-rates, higher temperatures are desirable to produce sufficiently severe conditions, while with lower space rates, lower temperatures may be used. The pressure conditions are less critical and may vary rather widely, as from about 30 p.s.i.g. to about 300 p.s.i.g. For the sake of economy, pressure may be about 55 p.s.i.g., which is equivalent to the interstage compression in commercial apparatus, thereby minimizing the effect of condensation of the $C_4$ and $C_5$ fractions.

For good alkylation or polymerization, the molal percentage of butadiene present should preferably be not over about 0.5% with 1.0% being about the outside practical limit, of the $C_4$ content. The present invention reduces the percentage of butadiene far below these figures, down to between zero and 0.2%, with correspondingly improved results in the alkylation or polymerization plant. Several examples follow.

EXAMPLE I

A simulated fluid coking fraction was obtained by adding butadiene to a sample of the $C_4$ fraction from a catalytic cracker in approximately the proportions normally found in fluidized coking. The simulated fraction was then hydrogenated over cobalt molybdate. A study of the operating variables is summarized in Table 1.

Table 1
HYDROGENATION OF SIMULATED FLUID COKER $C_4$ FRACTION

| Run No | 1 | 2 | 3 | 4 | 5 |
|---|---|---|---|---|---|
| Operating Conditions: | | | | | |
| Temperature (Max.), °F | 575 | 300 | 598 | 530 | 558 |
| Pressure, p.s.i.g | 200 | 200 | 200 | 100 | 200 |
| Liquid hourly space velocity (LHSV) | 20 | 20 | 20 | 10 | 40 |
| $H_2$ recycle rate, s.c.f./Bbl | 100 | 100 | 200 | 200 | 100 |
| Moles $H_2$/mole butadiene | 2.1/1 | 2.1/1 | 4.2/1 | 4.2/1 | 2.1/1 |

| | Feed | Product | | | | |
|---|---|---|---|---|---|---|
| | | 1 | 2 | 3 | 4 | 5 |
| Analysis (Mole Percent): | | | | | | |
| Butadiene | 3.8 | 0.0 | 3.3 | 0.1 | 0.0 | 1.2 |
| Butylene | 55.7 | 55.3 | 56.1 | 53.1 | 52.2 | 57.4 |

A comparison of runs 1 and 5 shows that LHSV's much above 20 results in incomplete saturation of butadiene, while a comparison of runs 1 and 3 appears to show that increased amounts of hydrogen resulted in a loss in butylene content as though due to conversion of some of the butylene to butane and iso-butane. However, see the results of Table 5.

EXAMPLE II

A sample of the $C_4$ and lighter gas fraction from a fluidized coking plant was mechanically compressed and passed over Hydrobon cobalt molybdate catalyst. A series of runs was made at pressures of 55 p.s.i.g. and 150 p.s.i.g., and at temperatures of 300° F. and 500° F. Table 2 summarizes some of the data obtained from this example.

Table 2
HYDROGENATION OF TOTAL FLUID COKER $C_4$'S AND LIGHTER

| Run No | 6 | 7 | 8 | 9 |
|---|---|---|---|---|
| Operating Conditions: | | | | |
| Temperature, °F | 300 | 500 | 500 | 500 |
| Pressure, p.s.i.g | 55 | 55 | 150 | 150 |
| Space velocity (s.c.f./Hr./c.f. Cat.) | 200 | 1,000 | 5,000 | 3,000 |

| | Feed | Product | | | |
|---|---|---|---|---|---|
| | | 6 | 7 | 8 | 9 |
| Analysis (Mole Percent): | | | | | |
| Butadiene | 0.2 | trace | trace | trace | trace |
| Olefins ($C_2$, $C_3$, $C_4$) | 16.5 | 13.8 | 13.5 | 14.0 | 12.9 |

Runs 6, 7, and 8 show that approximately the same results are obtained with space velocities of 200 at 300° F. and 55 p.s.i.g., 1000 at 500° F. and 55 p.s.i.g., and 5000 at 500° F. and 150 p.s.i.g. Lower space velocities of course increase the amount of hydrogenation (runs 8 and 9).

The fact that an excess of hydrogen was present was indicated also by the saturation of some of the ethylene, propane and butylene present.

EXAMPLE III

The gas from a fluid coking plant with hydrogen and the gases $C_4$ and lighter was run directly into a hydrogenation catalytic apparatus. The results are shown in the data on Table 3.

Table 3
Operating conditions:
  Run No. _____ 10
  Reactor temperature _____ °F__ 400
  Reactor pressure _____ p.s.i.g__ 55
  V./hr./v. (gas volume per hour per volume of catalyst in reactor) _____ 1660

COMPARISON OF GAS COMPOSITION BEFORE AND AFTER REACTION

|  | Before | After |
|---|---|---|
| Gas Composition, Mole Percent: |  |  |
| Hydrogen | 14.3 | 16.3 |
| Methane | 48.9 | 47.6 |
| Ethylene | 5.6 | 4.8 |
| Ethane | 11.6 | 12.0 |
| Propylene | 6.3 | 5.2 |
| Propane | 5.9 | 6.7 |
| $C_4$ Gases | 7.4 | 7.4 |
|  | 100.0 | 100.0 |
| $C_4$ Fraction—Mole Percent of Total $C_4$'s: |  |  |
| Butadiene | 2.5 | 0.0 |
| Butene-1 | 28.8 | 26.2 |
| Butene-2 | 14.4 | 20.1 |
| Iso-Butylene | 22.6 | 22.2 |
| Total Butylenes | 65.8 | 68.5 |
| Iso Butane | 6.5 | 5.2 |
| Butane | 25.2 | 26.3 |
|  | 100.0 | 100.0 |

EXAMPLE IV

Test runs have shown that reactor temperatures of 300° F. do not remove more than about 50% of the butadiene. On the other hand, temperatures of 475°–600° F. result in total removal of the butadiene but, being severe, also destroy substantial amounts of the desirable olefins. These results are shown in Table 4.

Table 4

$C_4$ GAS COMPOSITION BEFORE AND AFTER REACTIONS, MOLE PERCENT OF TOTAL $C_4$'s

| Run No | 11 | | 12 | |
|---|---|---|---|---|
| Reactor Temperature, °F | 310 | | 475 | |
| Reactor Pressure, p.s.i.g | 55 | | 55 | |
| V./Hr./V | 1,220 | | 740 | |
|  | Before | After | Before | After |
| Butadiene | 3.4 | 1.8 | 4.9 | 0.0 |
| Total Butylenes | 67.8 | 66.6 | 65.8 | 61.5 |
| Iso-Butane | 1.7 | 5.3 | 4.9 | 7.7 |
| n-Butane | 27.1 | 26.3 | 24.4 | 30.8 |
|  | 100.0 | 100.0 | 100.0 | 100.0 |

These tests and others lead me to the conclusion that the best results are obtained at about 400° F., 55 p.s.i.g., with vapor space velocities of 1200 to 2100 (standard cubic feet per hour of gas per cubic foot of catalyst) with good results in the temperature range of 350° F.–450° F., and with results that are satisfactory, so far as removal of the butadiene is concerned, from 350° F. to 600° F., though the higher temperatures give more isobutane and normal butane and less butylenes.

EXAMPLE V

It will be recalled that a comparison of runs 1 and 3 indicated that an excess of hydrogen might saturate some of the butylenes. Further tests were therefore run with high hydrogen-to-butadiene ratios—up to about 20 to 1. But no significant loss in butylene content was observed under the conditions of these further tests, as shown in Table 5. Differences in temperatures, pressures and space velocities did, however, produce further differences. In this example, the hydrogen used was pure cylinder hydrogen, and the charge stock was a blend of $C_4$ hydrocarbons of the same composition as those obtained from fluid coker operations (cf. Fig. 3).

Table 5

OPERATING CONDITIONS IN EXAMPLE V

| Run No | 13 | 14 | 15 | 16 | 17 |
|---|---|---|---|---|---|
| Reactor Pressure, p.s.i.g | 200 | 200 | 200 | 200 | 200 |
| Maximum Catalyst Temp., °F | 389 | 333 | 359 | 474 | 404 |
| LHSV Feed | 7.5 | 5.2 | 5.2 | 7.5 | 5.2 |
| V./Hr./V. Feed [1] | 1,900 | 1,300 | 1,900 | 1,900 | 1,300 |
| V./Hr./V. Feed+hydrogen | 2,200 | 2,300 | 3,100 | 2,200 | 2,300 |
| Hydrogen to Butadiene Ratio | 3.0 | 10.2 | 18.3 | 3.0 | 10.2 |
| Butadiene Percent Removal | 30 | 56 | 72 | 76 | 89 |
| Gain in Butylenes, Mole Percent | 1.3 | 2.6 | 3.9 | 3.2 | 3.6 |
| Gain in Butylenes, Percent Theoretical | 99.6 | 99.4 | 99.6 | 98.7 | 98.3 |

[1] S.c.f. per hour of gas per c.f. catalyst.

The specific composition (mole percent) of the charge and of the treated mixture is shown in Table 6.

Table 6

COMPARISON OF GAS COMPOSITION IN MOLE PERCENT BEFORE AND AFTER REACTION IN EXAMPLE V

| Run No | Charge | 13 | 14 | 15 | 16 | 17 |
|---|---|---|---|---|---|---|
| $N_2$+CO | | | | | | |
| Hydrogen | | 8.9 | 45.9 | 57.0 | 9.5 | 44.0 |
| Methane | | | | | | 0.1 |
| Ethylene | | 1.6 | 0.8 | 0.7 | 1.4 | 0.8 |
| Ethane | | 0.1 | | | | 0.1 |
| Propylene | 0.4 | 0.2 | 0.1 | | | |
| Propane | 1.8 | 1.6 | 0.9 | 0.7 | 1.5 | 1.0 |
| Butadiene | 5.3 | 3.3 | 1.2 | 0.6 | 1.1 | 0.3 |
| Butene-1 | 27.0 | 24.9 | 14.5 | 9.1 | 28.5 | 8.7 |
| Butene-2 | 6.9 | 7.3 | 5.1 | 7.0 | 6.0 | 12.3 |
| Iso-Butylene | 30.0 | 26.0 | 16.0 | 12.7 | 25.5 | 16.1 |
| (Total Butylenes) | (63.9) | (58.2) | (35.6) | (28.8) | (60.0) | (37.1) |
| Iso-Butane | 5.6 | 5.2 | 3.3 | 2.7 | 5.1 | 3.3 |
| n-Butane | 22.6 | 20.2 | 11.9 | 9.3 | 20.8 | 12.8 |
| Amylenes | 0.1 | 0.3 | 0.1 | 0.1 | 0.2 | 0.2 |
| Iso-Pentane | 0.3 | 0.4 | 0.2 | 0.1 | 0.4 | 0.3 |
| Total | 100.0 | 100.0 | 100.0 | 100.0 | 100.0 | 100.0 |

An analysis of the $C_4$ fraction in the same gases is shown in Table 7.

Table 7

$C_4$ FRACTION OF EXAMPLE V, MOLE PERCENT OF TOTAL $C_4$'s

| Run No | Charge | 13 | 14 | 15 | 16 | 17 |
|---|---|---|---|---|---|---|
| Butadiene | 5.4 | 3.8 | 2.4 | 1.5 | 1.3 | 0.6 |
| Butene-1 | 27.7 | 28.7 | 27.8 | 21.8 | 32.7 | 16.2 |
| Butene-2 | 7.1 | 8.4 | 9.7 | 17.0 | 6.9 | 23.0 |
| Iso-Butylene | 30.9 | 29.9 | 30.8 | 30.5 | 29.3 | 30.1 |
| (Total Butylenes) | (65.7) | (67.0) | (68.3) | (69.3) | (68.9) | (69.3) |
| Iso-Butane | 5.7 | 6.0 | 6.4 | 6.6 | 5.9 | 6.2 |
| n-Butane | 23.2 | 23.2 | 22.9 | 22.6 | 23.9 | 23.9 |
| Total | 100.0 | 100.0 | 100.0 | 100.0 | 100.0 | 100.0 |

EXAMPLE VI

Additional tests were run with the same charge stock as in Example V, but with the hydrogen being obtained from the discharge of a catalytic reformer compressor. The actual composition of this "hydrogen" charge is shown in Table 8.

Table 8

COMPOSITION OF "HYDROGEN" CHARGE USED IN EXAMPLE VI

| Gas: | Mole percent |
|---|---|
| $N_2$ and CO | 0.2 |
| $H_2$ | 91.1 |
| Methane | 2.3 |
| Ethane | 2.2 |
| Propane | 2.4 |
| Iso-butane | 0.7 |
| n-Butane | 0.5 |
| Iso-pentane | 0.6 |
|  | 100.0 |

The operating conditions of this Example are shown in Table 9.

Table 9
OPERATING CONDITIONS IN EXAMPLE VI

| Run No | 18 | 19 | 20 |
|---|---|---|---|
| Reactor Pressure, p.s.i.g. | 201 | 201 | 201 |
| Maximum Catalyst Temp., °F | 410 | 430 | 425 |
| LHSV Feed | 7.5 | 10.9 | 7.5 |
| V./Hr./V. Feed [1] | 1,900 | 2,600 | 1,900 |
| V./Hr./V. Feed+Hydrogen | 2,100 | 3,000 | 2,200 |
| Hydrogen to Butadiene Ratio | 1.7 | 3.5 | 2.7 |
| Butadiene Percent Removal | 22 | 30 | 33 |
| Gain in Butylenes, Mole Percent | 0.4 | 1.3 | 1.3 |
| Gain in Butylenes, Percent Theoretical | 98.8 | 99.6 | 99.3 |

[1] S.c.f. per hour of gas per c.f. catalyst.

The gas compositions concerned are shown in Table 10.

Table 10
COMPARISON OF GAS COMPOSITION (MOLE PERCENT) BEFORE AND AFTER REACTION IN EXAMPLE VI

| Run No | Charge | 18 | 19 | 20 |
|---|---|---|---|---|
| $N_2$+CO | | | | |
| Hydrogen | | 13.2 | 9.9 | 7.8 |
| Methane | | 0.1 | 0.6 | 0.2 |
| Ethylene | | 1.6 | 1.4 | 1.5 |
| Ethane | | 0.1 | 0.3 | 0.2 |
| Propylene | 0.4 | | | |
| Propane | 1.8 | 1.8 | 1.9 | 1.8 |
| Butadiene | 5.3 | 3.5 | 3.2 | 3.1 |
| Butene-1 | 27.0 | 25.8 | 23.7 | 26.4 |
| Butene-2 | 6.9 | 1.2 | 6.5 | 6.8 |
| Iso-Butylene | 30.0 | 27.7 | 26.9 | 25.8 |
| (Total Butylenes) | (63.9) | (54.7) | (57.1) | (59.0) |
| Iso-Butane | 5.6 | 4.9 | 4.8 | 5.4 |
| n-Butane | 22.6 | 19.5 | 20.1 | 20.3 |
| Amylenes | 0.1 | 0.3 | 0.3 | 0.2 |
| Iso-Pentane | 0.3 | 0.3 | 0.4 | 0.5 |
| Total | 100.0 | 100.0 | 100.0 | 100.0 |

Table 11 shows the detailed analysis of the $C_4$ fraction.

Table 11
$C_4$ FRACTION IN EXAMPLE VI, MOLE PERCENT OF TOTAL $C_4$'s

| Run No | Charge | 18 | 19 | 20 |
|---|---|---|---|---|
| Butadiene | 5.4 | 4.2 | 3.8 | 3.6 |
| Butene-1 | 27.7 | 31.3 | 27.9 | 30.0 |
| Butene-2 | 7.1 | 1.4 | 7.6 | 7.7 |
| Iso-Butylene | 30.9 | 33.4 | 31.5 | 29.3 |
| (Total Butylenes) | (65.7) | (66.1) | (67.0) | (67.0) |
| Iso-Butane | 5.7 | 6.0 | 5.6 | 6.2 |
| n-Butane | 23.2 | 23.7 | 23.6 | 23.2 |
| Total | 100.0 | 100.0 | 100.0 | 100.0 |

Having described the invention and illustrated its application by specific examples, I claim:

1. A process for eliminating butadiene from a dry mixture thereof with butylenes, comprising hydrogenating the dry mixture in the presence of cobalt molybdate catalyst at between 300° F. and 600° F. and at a vapor space velocity between 200 and 10,000 volumes of gas per volume of catalyst, to convert the butadiene to butylene while leaving the original butylene substantially unchanged.

2. The process of claim 1, wherein the hydrogenation is carried on at between 400° F. and 450° F. and at a vapor space velocity of between 1000 and 3000 volumes of gas treated per volume of catalyst.

3. A process for preparing a light fraction of off-gas effluent from fluidized coking for alkylation or polymerization, said off-gas fraction including hydrogen, butylene, iso-butane, and butane, and also butadiene in objectionable amounts, comprising reducing the butadiene content by passing said fraction substantially dry over a bed of cobalt molybdate hydrogenation catalyst at elevated temperatures in the range of 400° F. to 450° F., so that there is no substantial loss of butylene by hydrogenation thereof, while substantially all butadiene is converted to butylene.

4. A process for obtaining increased material suitable for gasoline blending from residual oil that has been subjected to cracking, comprising the steps of submitting the residual oil to a fluidized coking operation, passing the hot, normally gaseous, dry fraction of the effluent from said operation over a cobalt molybdate catalyst bed at between 300° F. and 600° F. and at a vapor space velocity between 200 and 10,000 volumes of gas per volume of catalyst so that the hydrogen contained therein reacts selectively with the butadiene therein to form butylene, fractionating the hydrogenated effluent, and passing the $C_4$ fraction thereof to an alkylation plant for direct reaction therein.

5. A process for obtaining increased material suitable for gasoline blending from heavy residual oil that has been subjected to cracking, comprising the steps of passing said residual oil over a fluidized bed of hot coke, fractionating the hot, normally gaseous, effluent therefrom to obtain hydrogen and a dry $C_4$ fraction, mixing said dry $C_4$ fraction with hydrogen in the ratio of at least one mole of hydrogen per mole of butadiene in said $C_4$ fraction, passing said mixture over a bed of cobalt molybdate at a temperature of between 300° F. and 600° F. and at a vapor space velocity between 200 and 10,000 volumes of gas per volume of catalyst to convert said butadiene to butylene and then alkylating the resultant $C_4$ fraction.

References Cited in the file of this patent
UNITED STATES PATENTS

| | | |
|---|---|---|
| 2,402,493 | Greensfelder | June 18, 1946 |
| 2,534,025 | Howes et al. | Dec. 12, 1950 |
| 2,674,634 | Greensfelder et al. | Apr. 6, 1954 |
| 2,694,671 | Baumgarten et al. | Nov. 16, 1954 |
| 2,717,861 | Baumgarten | Sept. 13, 1955 |
| 2,735,879 | Redcay | Feb. 21, 1956 |
| 2,742,518 | Mattox | Apr. 17, 1956 |
| 2,774,718 | Johnson | Dec. 18, 1956 |
| 2,861,946 | Sage et al. | Nov. 25, 1958 |

FOREIGN PATENTS

| | | |
|---|---|---|
| 427,632 | Great Britain | Apr. 23, 1935 |